(12) United States Patent
Aggarwal et al.

(10) Patent No.: US 12,461,924 B2
(45) Date of Patent: *Nov. 4, 2025

(54) USER ATTRIBUTE RESOLUTION OF UNRESOLVED TERMS OF ACTION QUERIES

(71) Applicant: GOOGLE LLC, Mountain View, CA (US)

(72) Inventors: Vikram Aggarwal, Palo Alto, CA (US); Alice Lee, Menlo Park, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/825,600

(22) Filed: Sep. 5, 2024

(65) Prior Publication Data

US 2024/0427778 A1 Dec. 26, 2024

Related U.S. Application Data

(63) Continuation of application No. 18/196,941, filed on May 12, 2023, now Pat. No. 12,086,147, which is a continuation of application No. 17/193,785, filed on Mar. 5, 2021, now Pat. No. 11,681,712, which is a continuation of application No. 16/216,521, filed on Dec. 11, 2018, now Pat. No. 10,956,425, which is a continuation of application No. 15/204,236, filed on Jul. 7, 2016, now Pat. No. 10,180,965.

(51) Int. Cl.
G06F 16/2457 (2019.01)
G06F 16/29 (2019.01)
G06F 16/335 (2019.01)
G06F 16/9535 (2019.01)
G06F 16/9537 (2019.01)

(52) U.S. Cl.
CPC ........ *G06F 16/24575* (2019.01); *G06F 16/29* (2019.01); *G06F 16/335* (2019.01); *G06F 16/9535* (2019.01); *G06F 16/9537* (2019.01)

(58) Field of Classification Search
CPC .......... G06F 16/24575; G06F 16/9535; G06F 16/9537; G06F 16/355; G06F 16/29
USPC ...................................................... 707/721
See application file for complete search history.

(56) References Cited

U.S. PATENT DOCUMENTS

| 7,072,884 B2 | 7/2006 | Kemp |
| 7,603,367 B1 | 10/2009 | Kanter et al. |
| 7,765,227 B1 | 7/2010 | Khoshnevisan et al. |
| 9,286,910 B1 | 3/2016 | Li et al. |

(Continued)

FOREIGN PATENT DOCUMENTS

| CN | 102609444 | 7/2012 |
| WO | 2010034056 | 4/2010 |

(Continued)

OTHER PUBLICATIONS

Deutsches Patent Office; Examination Report issued in Application No. DE102017115016.1; 10 pages; dated Jan. 8, 2025.

(Continued)

*Primary Examiner* — Shahid A Alam
(74) *Attorney, Agent, or Firm* — Gray Ice Higdon

(57) ABSTRACT

User attribute data associated with a user may be used to resolve unresolved entities in connection with the performance of computer-based actions, e.g., actions resulting from action queries generated based at least in part on content being accessed on a computing device.

20 Claims, 6 Drawing Sheets

(56) References Cited

U.S. PATENT DOCUMENTS

| | | |
|---|---|---|
| 10,180,965 B2 | 1/2019 | Aggarwal et al. |
| 10,956,425 B2 | 3/2021 | Aggarwal et al. |
| 2004/0083203 A1 | 4/2004 | Kemp |
| 2007/0116112 A1 | 5/2007 | Gu et al. |
| 2007/0168382 A1 | 7/2007 | Tillberg et al. |
| 2008/0275784 A1 | 11/2008 | Kramer et al. |
| 2010/0299136 A1 | 11/2010 | Tong et al. |
| 2012/0117058 A1 | 5/2012 | Rubinstein et al. |
| 2013/0073388 A1 | 3/2013 | Heath |
| 2014/0019462 A1 | 1/2014 | Heck et al. |
| 2014/0358958 A1 | 12/2014 | Mandic et al. |
| 2016/0055246 A1 | 2/2016 | Marcin et al. |
| 2021/0191948 A1 | 6/2021 | Aggarwal |
| 2023/0281206 A1 | 9/2023 | Aggarwal et al. |

FOREIGN PATENT DOCUMENTS

| | | |
|---|---|---|
| WO | 2012019028 | 2/2012 |
| WO | 2012064530 | 5/2012 |
| WO | 2015103238 | 7/2015 |
| WO | 2016029099 | 2/2016 |

OTHER PUBLICATIONS

European Patent Office; Brief Communication issued in Application No. 17740859.8; 8 pages; dated Nov. 24, 2023.
Intelectual Property India; Examination Report Issue in Application Serial No. 202148011694; 7 pages; dated Dec. 14, 2023.
European Patent Office; Summons to attend oral proceedings issued in Application No. 17740859.8; 9 pages; dated Jul. 31, 2023.
China National Intellectual Property Administration; Decision on Rejection issue in Application No. 201710550534.5; 7 pages; dated Nov. 2, 2021.
European Patent Office; Communication Pursuant to Article 94(3) issued in Application No. 17740859.9; 8 pages; dated Jul. 9, 2021.
China National Intellectual Property Administration; Notification of Second Office Action issue in Application No. 201710550534.5; 7 pages; dated Feb. 3, 2021.
China National Intellectual Property Administration; Notification of Third Office Action issue in Application No. 201710550534.5; 27 pages; dated Jul. 6, 2021.
Intelectual Property India; Examination Report Issue in Application Serial No. 201847003815; 7 pages; dated Sep. 24, 2020.
China National Intellectual Property Administration; Notification of First Office Action issue in Application No. 201710550534.5; 25pages; dated Apr. 3, 2020.
European Patent Office; International Preliminary Report on Patentability of PCT Ser. No. PCT/US2017/040871, 9 pages, dated Jan. 17, 2019.
International Search Report and Written Opinion of PCT Ser. No. PCT/US2017/040871; 14 pages Sep. 15, 2017.
European Patent Office; Written Opinion of the International Preliminary Examining Authority of International Application No. PCT/US2017/0408741; dated Jun. 13, 2018.
China National Intellectual Property Administration; Reexamination Notice issue in Application No. 201710550534.5; 20 pages; dated May 15, 2025.
China National Intellectual Property Administration; Decision of Reexamination issued in Application No. 201710550534.5; 28 pages; dated Sep. 23, 2025.

USER ATTRIBUTE RESOLUTION OF UNRESOLVED TERMS OF ACTION QUERIES

BACKGROUND

Computing devices, and in particular mobile computing devices, have become ubiquitous in modern society, and attempts to increase both the usability and the usefulness of such devices are ongoing. Natural language techniques as well as other non-explicit input techniques continue to evolve in order to simplify a user's interaction with a computing device, e.g., to perform various computer-based actions such as performing a search, providing driving directions, or otherwise controlling one or more applications of a computing device.

Some techniques rely on the current context of a user's interaction with a computing device to attempt infer the user's intent when performing actions on behalf of the user. Thus, for example, what a user is currently doing with a computing device and/or what a user has recently done with a computing device may be used to assist in interpreting future user requests. However, in some instances, the context of a user's interaction with a computing device may be incomplete and/or may be subject to multiple interpretations, making it difficult to provide assistance when interpreting a user request. Thus, a need continues to exist for improvements in the interpretation of user requests in the absence of sufficient context.

SUMMARY

Some implementations of the technology of this specification may utilize user attribute data associated with a user to resolve unresolved entities in connection with the performance of computer-based actions, e.g., actions resulting from action queries generated based at least in part on content being accessed on a computing device.

In particular, some implementations of this specification are generally directed to a method that includes receiving, at a computing device, input to initiate providing of an action query via the computing device; identifying, by the computing device, content displayed by the computing device most recently relative to receiving the input; identifying at least one action term for the action query in response to receiving the input, the action term being mapped to at least one entity term and configured to initiate performance of a computer-based action; determining an inability to resolve the at least one entity term from the identified content; and in response to determining the inability to resolve the at least one entity term from the identified content, resolving the at least one entity term using user attribute data stored in the computing device.

Some implementations also include performing the computer-based action using the identified at least one action term, a current location and the resolved at least one entity term. In some implementations, performing the computer-based action includes querying a remote computing system and providing a response thereto on the computing device using response data received from the remote computing system, while in some implementations, performing the computer-based action includes querying a local database stored on the computing device and providing a response thereto on the computing device using response data received from the local database. In some implementations, the local database includes point of interest data.

In addition, in some implementations, identifying the at least one action term for the action query in response to receiving the input is based at least in part on the identified content. In some implementations, determining the inability to resolve the at least one entity term includes determining that the action term is a vague action term, in some implementations, determining the inability to resolve the at least one entity term includes determining that an entity in the identified content is subject to multiple interpretations, and in some implementations, determining the inability to resolve the at least one entity term includes determining an inability to determine a species for a genus determined in the identified content.

In some implementations, resolving the at least one entity term further uses location data stored in the computing device, the location data including a current location of the computing device, point of interest data stored in a point of interest database in the computing device or beacon data received from a beacon in proximity to the computing device. In some implementations, the identified action term is a point of interest search, the at least one entity term includes a point of interest category term, and resolving the at least one entity term using the user attribute data stored in the computing device includes resolving the point of interest category term. In some implementations, the point of interest category term is resolvable among one or more of a restaurant category, a shopping category, an activity category, a services category, and an entertainment category. In addition, in some implementations, resolving the at least one entity term using the user attribute data stored in the computing device includes resolving a subcategory for the resolved point of interest category term.

In addition, some implementations include an apparatus including memory and one or more processors operable to execute instructions stored in the memory, where the instructions are configured to perform any of the aforementioned methods. Some implementations also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
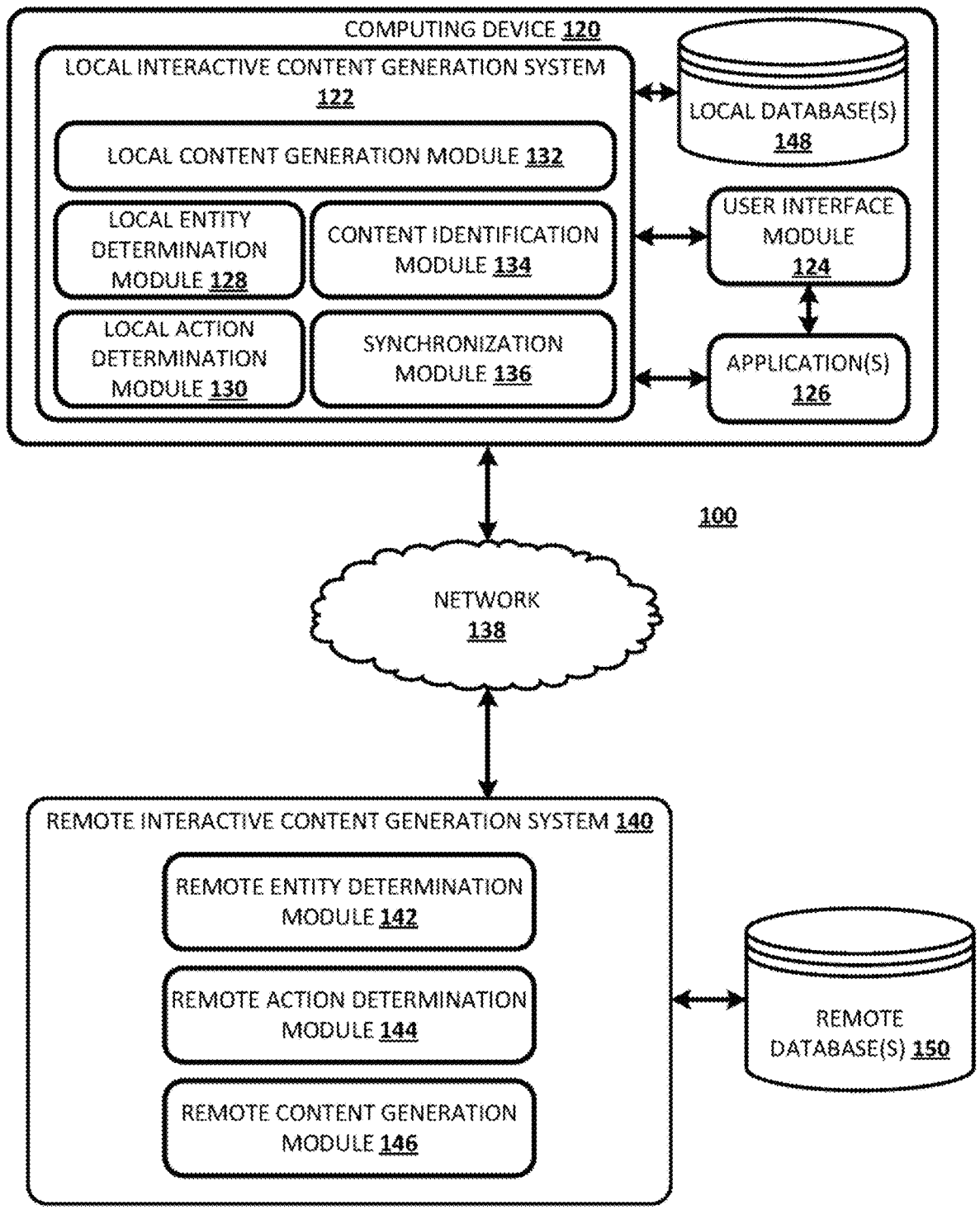
FIG. 1 is a block diagram of an example environment in which techniques disclosed herein may be implemented.

In implementations described herein, techniques are disclosed for using user attributes to resolve unresolved entities in connection with the performance of computer-based actions, e.g., actions resulting from action queries generated based at least in part on content being accessed on a computing device. In some implementations, for example, a computing device may receive input to initiate providing of an action query via the computing device, and in response, the computing device may identify content displayed by the computing device most recently relative to receiving the input, as well as identify at least one action term for the action query. The computing device may then determine an inability to resolve at least one entity term associated with the action query from the identified content, and in response to determining the inability to resolve the at least one entity term from the identified content, resolve the at least one entity term using user attribute data stored in the computing device.

In this regard, a computer-based action may be considered to include various operations capable of being performed by a computer, while an action query may be considered within the context of this disclosure to include a request or command to perform a computer-based action. Thus, for example, while it will be appreciated that while the term "query" is used to describe an action query in this disclosure, an action query is not limited to actions that merely generate search results, but may include practically any action that can be implemented in a computer.

In some implementations, for example, a computer-based action may be mapped to one or more computer applications that can perform the action and execution of an action query that includes a term associated with the action may cause at least one of those computer applications to automatically perform the action, or present an option for performance of the action. For example, an action associated with "calling" may be mapped to a phone application, an action associated with "making a reservation" may be mapped to a restaurant, travel, or ticket reservation application, etc. In some implementations, a computing device, e.g., an operating system of the computing device, may perform some of an action, the entirety of an action, and/or may process an action query to facilitate performance of an action by another application, computing device or data processing system (e.g., parse the query and interface with another application based on the parsed query and an API of the application).

In the illustrated implementations, an action query may include one or more action terms and one or more entity terms, with the former defining or identifying one or more computer-based actions to be performed, and the latter defining or identifying one or more entities effectively serving as inputs, outputs, parameters or other associated data for the associated computer-based actions. In some implementations, action terms may be analogized to verbs and entity terms may be analogized to nouns or pronouns.

As noted above, in some implementations a computing device may be configured to determine an inability to resolve an entity term associated with an action query from identified content displayed by a computing device. The identified content may be associated with a current context that represents recent interaction between a computing device and a user of the computing device, e.g., the information displayed by an application executing on the computing device and/or user input previously provided by the user to an application. The identification of content may be implemented in a number of manners in various implementations, e.g., via content analysis of the user controls presented by an application, via image analysis of a screen shot of an application, via monitored user input to an application, via monitored output presented to a user by an application, etc. Content analysis may also be performed outside of the scope of a particular application, and may also be implemented for a more generalized interaction between a user and a computing device, and may include interaction with an operating system and/or interaction with multiple applications that are executing concurrently on a computing device.

The herein-described implementations, in particular, may be usable in instances where any identified content representing a current context of a user is too general and is thus insufficient by itself to identify any meaningful entities within which to characterize an action. It has been found, for example, that a context derived through content analysis may in some instances be too general on its own, or may be subject to multiple, equally likely interpretations, to provide meaningful guidance, yet when a user has initiated an action query, the user is still expecting assistance of some sort. Furthermore, particularly for mobile computing devices where network connectivity may be transient or non-existent in some situations, it may be desirable to provide some assistance even when access to a remote service is not possible. In some instances, for example, a context derived from content analysis may be based upon a vague action or request, e.g., "I'm bored," "I'm hungry," "Let's go somewhere," etc.

In the implementations discussed herein, an insufficiently-specific context may be supplemented by user attribute data, e.g., as may be stored within a computing device. Specifically, in some implementations, identified content and/or other input from a user may be used to identify at least one action term, and optionally at least one entity term, for an action query. Furthermore, an inability to resolve at least one other entity term for the action query from the identified content may be determined, and in response to that determination, the at least one other entity term may be resolved using user attribute data stored in the computing device.

The user attribute data may include various information maintained about a user, e.g., user history, user interests (e.g., favorite teams, activities, pastimes, media items, authors, artists, etc.), and similar information associated with a user and capable of supplementing an insufficiently-specific context. The user attribute data may be stored locally on a computing device and/or available from a remote service.

It will be appreciated that whether or not an entity term for an action query can be resolved from identified content may vary in different implementations. For example, it may be determined that an entity term cannot be identified at any level of detail from identified content, and/or that an action term for an action query is vague enough such that an associated entity term cannot be identified from the identified content within the context of the type of action term involved. It may also be determined that an entity term cannot be resolved when a potential entity in the identified content is subject to multiple interpretations, e.g., where the term "cats" could be interpreted as either an animal or a musical. It may also be determined that an entity term cannot be resolved when a potential entity in the identified content is a genus or category for which a species or subcategory cannot be resolved. For example, where the identified content includes a statement such as "I'm hungry," the determined action term may be "suggest a point of interest," and an entity term may be "restaurant", "restaurant" may potentially be restricted to certain types of cuisines based upon a user's preferences.

It will also be appreciated that the manner in which an entity term may be resolved using user attribute data may also vary in different implementations. For example, user attribute data may be used to determine a category or subcategory for an entity term, such as to determine an activity or point of interest category for a "suggest a point of interest" action query, or to determine a type of cuisine for a "suggest a restaurant" action query.

In some implementations, for example, a point of interest category entity term may be resolvable based upon content and/or user input to select from various higher-level categories such as a restaurant category, a shopping category, an activity category, a services category, and an entertainment category, among others, while a subcategory within each of the categories may be unresolvable simply from content. In such implementations, user attribute data may be used, for example, to resolve a subcategory, e.g., to resolve for an activity category between hiking, skydiving, running, swimming, biking, etc.

In addition, user attribute data may also be combined with additional data, such as location data, to resolve an entity term. The location data may include, in some implementations, the current location of the user or the computing device being used by the user (e.g., as obtained from GPS), such that an action query is specific to the user's current location. In some instances, the location data may include point of interest data, e.g., information maintained in a local or remote point of interest database and usable to determine a user's current surroundings such as whether the user is in a park, in a city, in an entertainment district, in a shopping center, in a rural area, etc. Location data may also, in some implementations, include beacon data broadcast by a beacon in proximity to the user's computing device. Other types of data, e.g., time and/or date data, user attribute data for other users (e.g., other users with which a user is communicating) may also be combined with user attribute data to resolve entity terms in other implementations.

Once any entity terms are resolved, the computer-based action associated with an action query may be performed. In some implementations, for example, a computer-based action may be performed using one or more action terms, a current location of the user or the user's computing device, and any resolved entity terms. Further, in some implementations, a computer-based action may include querying a remote computing system and providing a response thereto on the computing device using response data received from the remote computing system. In some implementations, however, a computer-based action may be performed locally on a computing device, e.g., by querying a local database stored on the computing device and providing a response thereto on the computing device using response data received from the local database.

Other variations will be apparent to ordinary artisans having the benefit of the instant disclosure.

Now turning to FIG. 1, an example environment 100 in which techniques disclosed herein may be implemented is illustrated. The example environment includes a computing device 120, which may include a local interactive content generation system 122 interfaced with a user interface module 124 and one or more applications 126. In some implementations, the computing device 120 is a portable mobile computing device such as a cellular phone, tablet computer, laptop computer, watch, head-mounted device (e.g., glasses), virtual or augmented reality device, other wearable device, an audio/video system, a navigation system, automotive and other vehicular system, etc., although other types of computing devices, e.g., desktop computers, digital assistants, set-top boxes, etc. may also be used.

User interface module 124 may receive input from, and generate output for, a user in various manners in different implementations, and in many instances based upon the form factor of the particular computing device 120. Visual, textual, graphical, audible, and/or speech input and/or output may be supported, and in some instances, at least a portion of the functionality of module 124 may be implemented external from computing device 120, e.g., in a remote device or system.

Applications 126 may include various types of applications that may execute on a computing device, e.g., mobile apps for a mobile computing device. It will be appreciated that the functionality of an application may also be incorporated into an operating system, kernel, or other lower-level software in some implementations.

Local content generation system 122 generates interactive content, for presentation to a user via the computing device 120, where the interactive content is tailored to content being displayed to the user by the computing device 120. A content identification module 134, for example, may identify content relevant to a current context of the user, and local entity and action determination modules 128, 130 may be used to determine one or more entities and/or actions in the content identified by content identification module 134.

In some implementations, entity determination module 128 receives, from content identification module 134, an indication of the content present in a region of a screenshot image of content displayed to a user via the computing device 120. The entity determination module 128 may determine one or more entities referenced in the content based on the provided indication. An entity may be, for example, associated with one of a person, a location of interest, an address, a phone number, etc. In implementations, the indication explicitly indicates an entity and the entity determination module 128 may select that entity and/or one or more related entities as entities that will be the focus of one or more aspects of generated interactive content.

In some implementations, the indication provided by content identification module 134 does not explicitly indicate an entity. For example, various content recognition engines may be used to provide text that is present in a textual region, but not explicitly indicate any entity associated with the text. In some of those implementations, the entity determination module 128 may determine one or more entities based on such information. For instance, entity determination module 128 may determine one or more entities that are strongly associated with text or other information in one or more entity databases, such as a knowledge graph. For example, the text may be most strongly associated with an alias of a particular entity.

In some implementations, action determination module 130 determines one or more computer-based actions that can be performed based upon one or more of the content identified content identification module 134, user input received from user interface module 124 and in some instances, from one or more entities determined by entity determination module 128. In some of those implementations, action determination module 130 determines the computer-based actions based on the computer-based actions being mapped to an entity in one or more databases such as local database(s) 148. Local database 148 may include, for example, a mapping of each of a plurality of entities to one or more computer-based actions associated with the entity. An action may be directly mapped with an entity and/or may be indirectly mapped to the entity via a mapping with a class of the entity. For example, the action of dialing a phone number may be mapped to each of a plurality of particular phone numbers and/or may be associated with the class of phone numbers in general. Also, for example, the action of playing a movie may be mapped to each of a plurality of movies, movies in general, and/or only movies that are available for on-demand viewing via one of the applications 126 installed on the computing device 120.

In implementations where multiple actions are identified for an entity, action determination module 130 may optionally rank and/or filter the identified actions based on one or more factors such as, for example: strengths of association of the actions to the entity and/or a class of the entity; historical popularity of the actions in general; historical popularity of the actions for the application from which the content originated; whether the actions are performable via one or more applications 126 installed on the computing device 120; historical popularity of performance of the actions via one or more applications 126 installed on the computing device 120; etc.

A local content generation module 132 may generate, based on the actions determined by module 130, interactive content to be presented to the computing device 120. The interactive content may be in visual, audible, and/or other form capable of being provided the user via one or more user interface output devices of the computing device 120. As one example, the interactive content may include a graphical element (text, icon, and/or an image) that, when selected by a user via a user interface input device of the computing device 120, causes the computing device 120 to perform one or more actions. For example, the graphical element may be associated with a link that causes performance of the one or more actions. Actions may include, for example, accessing a particular webpage, issuing a particular search, accessing a particular state of an application, rendering additional media, etc. Multiple items of interactive content may optionally be generated and interactive content may optionally be provided in combination with non-interactive content, such as content that includes an alias or other properties of one or more entities.

Computing device 120 may be interfaced via a network 138 with a remote interactive content generation system 140. Network 138 may comprise one or more networks such as a local area network (LAN) or wide area network (WAN) (e.g., the Internet). Local and remote interactive content generation systems 122, 140 may be configured in a client-server architecture, peer-to-peer architecture, or other suitable architecture, while in some implementations, the functionality allocated to each of these systems may be partitioned differently between the systems. Furthermore, in some implementations all of the interactive content generation functionality may be incorporated into computing device 120.

Remote interactive content generation system 140 may include remote entity determination, action determination and content generation modules 142, 144 and 146 having similar functionality to local entity determination, action determination and content generation modules 128, 130 and 132. In this regard, a synchronization module 136 may also be used to manage communications between local and remote interactive content generation systems 122, 140. In addition, while not shown in FIG. 1, a remote content identification module may also be provided in remote interactive content generation system 140 in some implementations. Further, in some implementations, local modules 128, 130 and 132 may incorporate reduced functionality relative to remote modules 142, 144 and 146 such that local modules are only used when network connectivity is sparse or non-existent. In other implementations, however, the functionality of action determination, entity determination and/or content generation may be allocated solely to computing device 120 or a remote system. Still further, in some implementations content identification, e.g., as performed by content identification module 134, may be handled remotely from computing device 120.

Computing device 120 may also include one or more local databases 148, including, for example, entities, actions, user attribute data, location data, point of interest data, event data, cached search results, and practically any other data that may be used in connection with generating interactive content in the manner disclosed herein. Likewise, one or more remote databases 150 including similar data as database 148, and in many instances, aggregated for multiple users, may also be accessible by remote interactive content generation system 140. Among other functions, synchronization module 136 may also be used to synchronize data between databases 148, 150.

Figure 2:
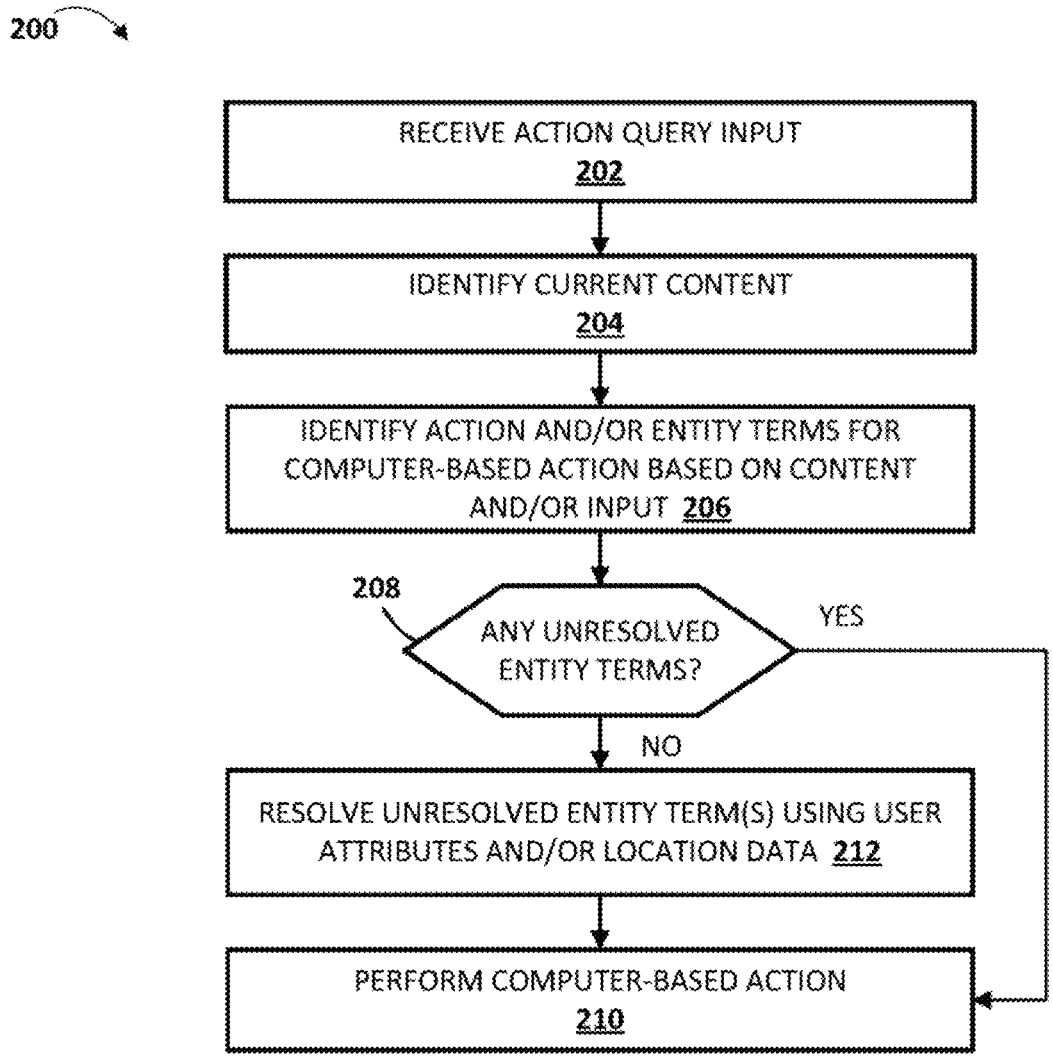
FIG. 2 is a flowchart illustrating an example method of performing a computer-based action in the environment of FIG. 1.

FIG. 2 next illustrates an example sequence of operations 200 for performing a computer-based action in the environment of FIG. 1. The sequence may be initiated as illustrated in block 202 by receiving an action query input. The input may take a number of different forms in different implementations, including, but not limited to, selection of a displayed button or other control, selection of a hard button, voice input, text input, visual input, gesture input, etc. The input may be received from within an application or external to an application, and in some implementations may include data that may be used in connection with content data and other contextual information to generate an action query and perform a computer-based action in response thereto. In other implementations, however, the received input may be devoid of any information beyond an indication that the user is interested in invoking a computer-based action based upon the user's current context (e.g., by selecting a button when certain content is displayed to the user).

Next, in block 204, content associated with a current context for the user/computing device is identified, e.g., by content identification module 134. The content may, for example, be accessed on the computing device 120 in one of the applications 126. The applications 126 may include one or more of a variety of applications that may be installed on the computing device 120 such as, for example, a web browser application, a messaging application, a personal assistant application, a business reviews application, a social networking application, a music application, a video application, and/or an application that provides an interface for exploring information about movies, TV shows, and other media. In some implementations, the indication of the content may comprise indications that are specific to the "view port" of the content on the computing device 120. For example, text of the content and a screenshot of the content may be provided for only that portion of the content that is actively displayed on the computing device 120. In some implementations, the indication of the content may additionally and/or alternatively comprise indications for portions of the content that are not actively displayed on the computing device 120. For example, metadata that is not actively displayed may be provided and/or text from other portions of the content that are not actively displayed may be provided. For instance, text that it is not displayed, but would be displayed by scrolling up or down, may be provided.

Next, in block 206, entity and action determination may be performed to identify action and/or entity terms for a computer-based action, e.g., using local and/or remote entity and action determination modules 128, 130, 142, 144. The identification may be based on the identified content, and in some instances, on the received input and/or other contextual information for the computing device 120 that is representative of what action the user is intending to invoke. Entities and actions may be determined individually in some implementations, while in other implementations, determinations may be interrelated, e.g., where the determination of an entity may suggest a limited set of actions that may be relevant to that entity, and vice versa. Block 206 attempts to generate an action query including one or more action terms and one or more entity terms that, when invoked, performs an associated computer-based action. Entity and/or action terms may be determined, for example, based on text, metadata, transcripts, URLs, images, tags applied to image(s), and/or screenshots of the content most recently viewed on the computing device, and in some instances, a determination may be made as to what the most dominant entity is incorporated into the content, e.g., based on position, format, frequency, and/or other property of the content. As used herein, a dominant entity in content refers to the entity in the content that is most prevalent, and is thus the likely focus of the input.

Actions and entities may be mapped to one another in databases 148, 150 in some implementations. In some instances, for example, an action may be directly mapped with an entity and/or may be indirectly mapped to the entity via a mapping with a class or category of the entity. For example, the action of dialing a phone number may be mapped to each of a plurality of particular phone numbers and/or may be associated with the class of phone numbers in general. Also, for example, the action of playing a movie may be mapped to each of a plurality of movies, movies in general, and/or only movies that are available for on-demand viewing via one of the applications installed on the computing device 120.

In implementations where multiple actions are identified for an entity, actions may optionally be ranked and/or filtered based on one or more factors such as, for example: strengths of association of the actions to the entity and/or a class of the entity; historical popularity of the actions in general; historical popularity of the actions for the application from which the content originated; whether the actions are performable via one or more applications 126 installed on the computing device 120; historical popularity of performance of the actions via one or more applications 126 installed on the computing device 120; etc.

Upon completion of block 206, block 208 next determines whether any entity terms for the action query under construction remain at least partially unresolved based on the identified content and/or input. As noted above, an entity term may be unresolved, for example, when no entity is mapped to the entity term, or alternatively, when an entity term is only partially resolved, e.g., to a category or genus that itself is insufficient to derive a useful computer-based action to perform. In such instances, it is possible that further resolution to a subcategory or species of the category or genus may enable a more useful computer-based action to be derived.

Where all entity and action terms for an action query are suitable resolved, block 208 passes control to block 210 to initiate performance of the computer-based action associated with the specified action query. However, if one or more entity terms remain unresolved, block 208 first passes control to block 212 to resolve such entity term(s) using user attributes and/or location data, e.g., in the manner described above, and then passes control to block 210 to initiate performance of the computer-based action associated with the specified action query using the additionally-resolved entity term(s).

For example, block 212 may resolve an entity term using user attribute data by determining a category or subcategory for an entity term, such as to determine an activity or point of interest category for a "suggest a point of interest" action query, or to determine a type of cuisine for a "suggest a restaurant" action query. In addition, user attribute data may also be combined with additional data, such as location data, to resolve an entity term. The location data may include, in some implementations, the current location of the user or the computing device being used by the user (e.g., as obtained from GPS), point of interest data and/or beacon data in some implementations.

Returning to block 210, performance of a computer-based action may be based on one or more action terms and any resolved entity terms associated with a determined action query, as well as, in some instances, a current location of the user or the user's computing device. Performance of an action may include actions that are handled entirely within computing device 120, as well as actions having portions handled within computing device 120 and portions handled externally thereto (e.g., in a remote system), as well as actions handled predominantly externally from a computing device 120, where the performance by the computing device may be limited to sending a request to another device or system that causes the other device or system to complete performance of the action. One non-limiting example, for example, is initiation of a location-based query on a remote system to obtain search results for presentation on the computing device.

Figure 3:
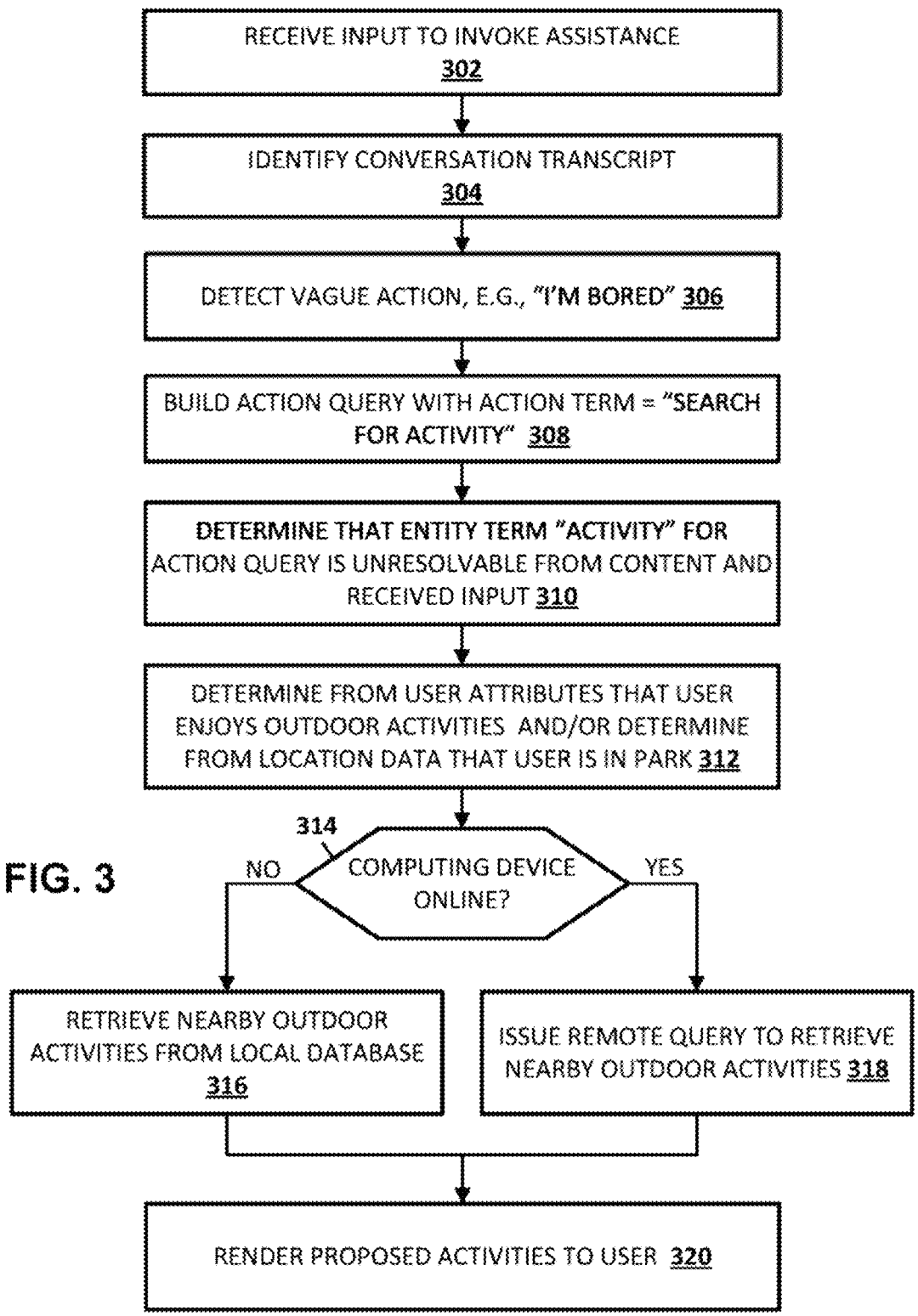
FIG. 3 is a flowchart illustrating another example method of performing a computer-based action in the environment of FIG. 1.

It will be appreciated that the functionality discussed in connection with FIG. 2 may be implemented in a number of manners in various implementations. FIG. 3, for example, illustrates a sequence of operations 300 for performing a computer-based action such as a request for contextual assistance in a computing device. In this implementation, for example, computing device 120 may be a mobile phone, and a user may initiate the sequence of operations by selecting a hard button on the computing device when interacting with a messaging application. As such, block 302 represents the receipt of the user input to invoke assistance. Upon receipt of the user input, block 304 then identifies a conversation transcript in the messaging application, and block 306 detects from the content a computer-based action that is vague in nature, e.g., a statement of "I'm bored."

Block 308 may then build an action query for the vague action, including, for example, an action term representing a search for an activity that can address the user's boredom and an "activity" entity term that specifies a type or category of activity to search for. Block 310 then determines that the "activity" entity term is unresolvable from the content (assuming no indication as to the type of activity in which the user is interested in participating is present in the transcript) as well as from the initial input (since the input was merely a hard button selection).

Block 312 next accesses user attributes and/or location data to attempt to determine potential entities capable of being mapped to the "activity" entity term for the action query. For example, block 312 may access user attributes to determine that the user enjoys outdoor activities. Block 312 may also determine from location data, e.g., nearby points of interest and/or nearby beacon data that the user is currently located in a park. Based upon one or both of those determinations, an "activity" entity term for the action query may specify an activity class such as "outdoor," "hiking," "running," "fitness," or some other category or subcategory.

Blocks 314-318 next illustrate support for both offline and online performance of actions, although it will be appreciated that in other implementations only offline or only online actions may be supported. Block 314, in particular, determines whether the computing device is currently online. If not, control passes to block 316 to retrieve nearby outdoor activities based on point of interest data in local database 148 and the known location of the computing device. If the computing device is online, block 314 may instead pass control to block 318 to issue a query to a remote system to retrieve search results of nearby outdoor activities. Irrespective of how the outdoor activities are retrieved, block 320 renders those proposed activities to the user, and performance of the action is complete.

Figure 4:
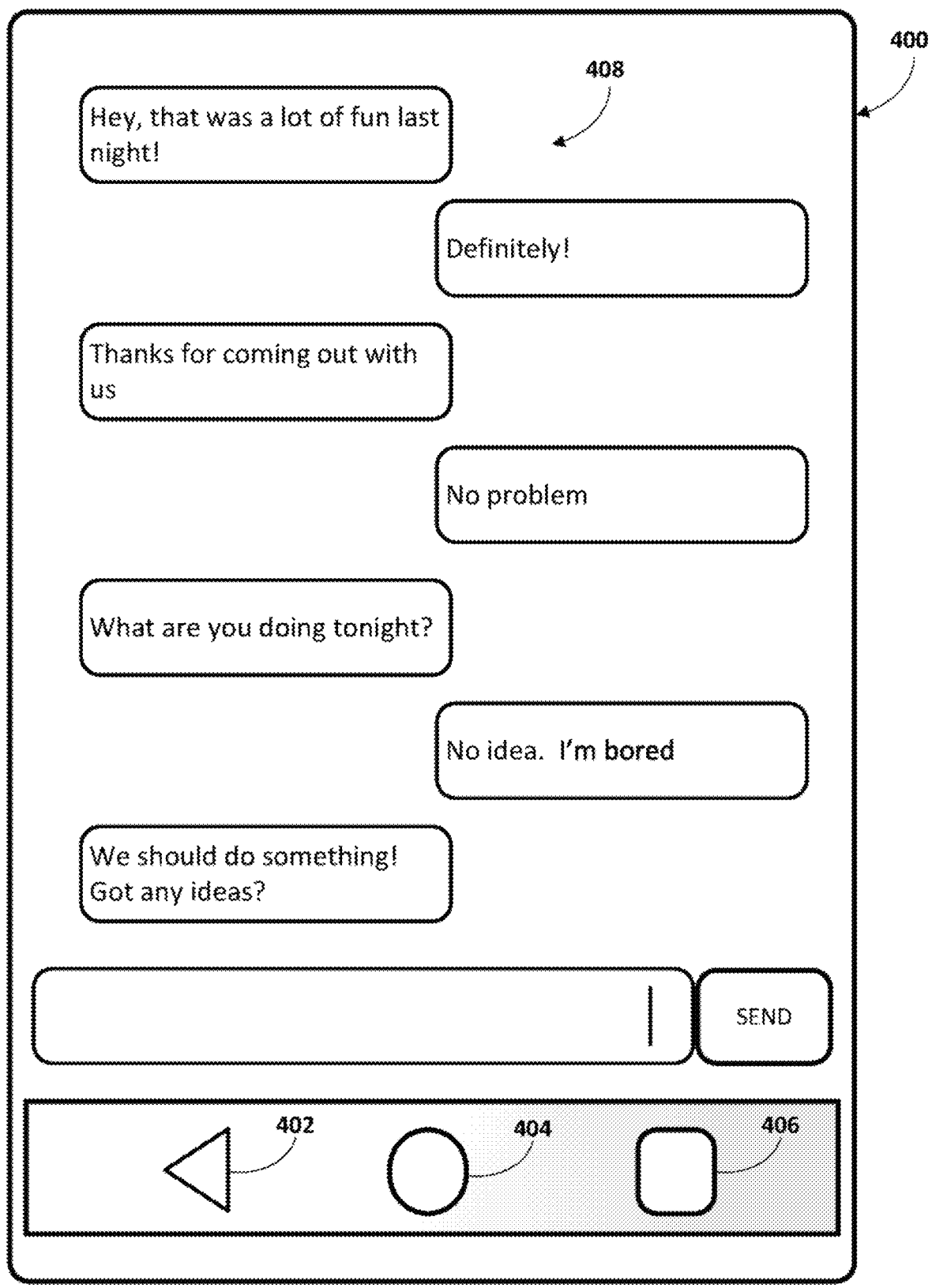
FIG. 4 illustrates an example graphical user interface showing content displayed in an application of a computing device.
Figure 5:
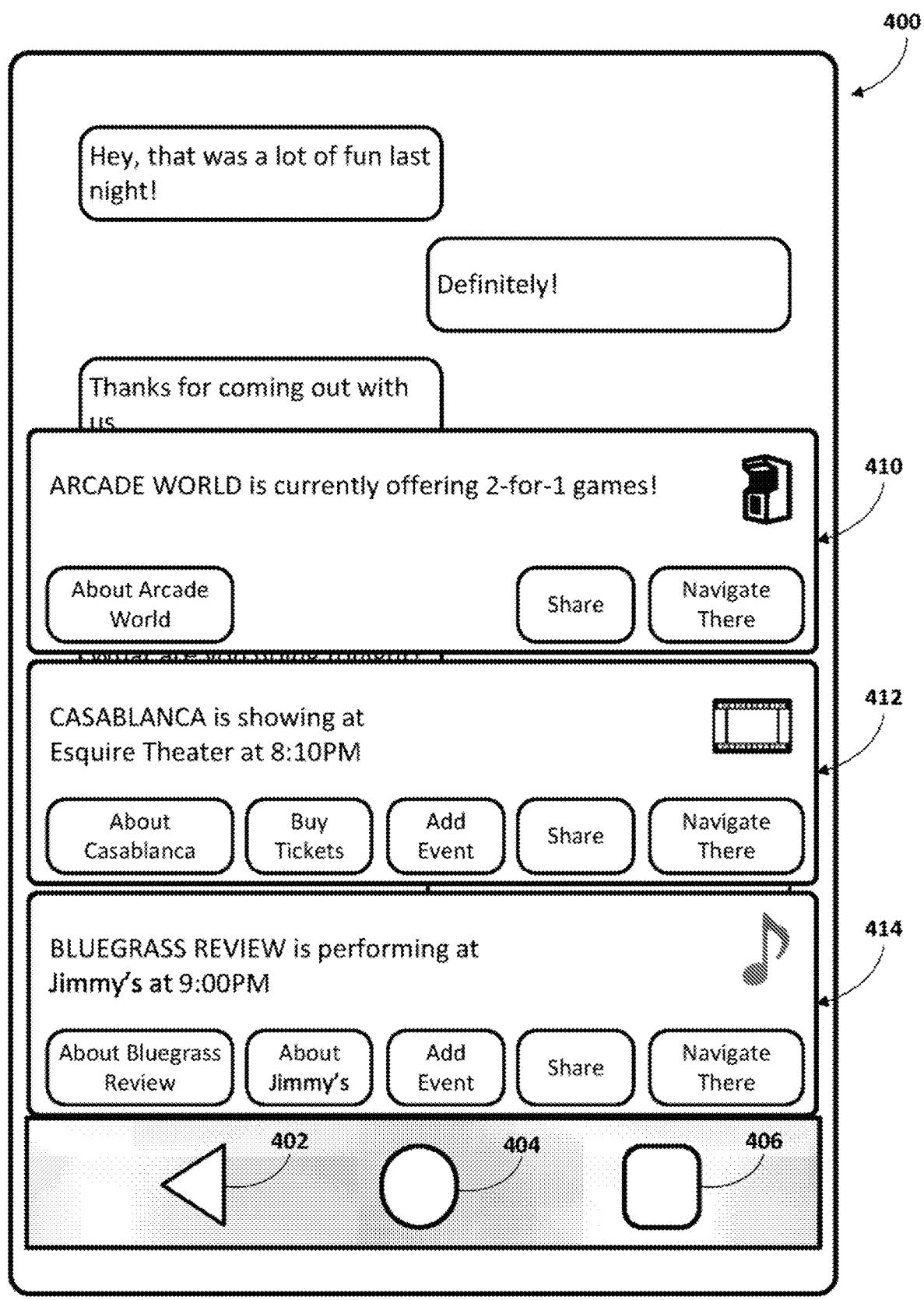
FIG. 5 illustrates an example graphical user interface showing performance of a computer-based action based on the content of FIG. 4.

FIGS. 4-5 also illustrate by way of example the performance of a computer-based action using the techniques disclosed herein. FIG. 4, in particular, illustrates an example graphical user interface 400 showing content displayed in an application of a computing device. For example, the graphical user interface 400 may be displayed on a mobile phone computing device. The content is displayed in the graphical user interface 400 by an application of the computing device, such as a messaging application. The graphical user interface 400 also includes graphical interface elements 402, 404 and 406 that may each, when actuated, cause one or more actions to be performed. Additional and/or alternative graphical and/or other (e.g., mechanical) interface elements may be provided. Graphical user interface 400 includes, for example, a conversation transcript 408 between the user and another individual.

FIG. 5 illustrates graphical user interface 400 after performance of a computer-based action, e.g., in response to user input such as the user selecting element 404 while conversation transcript 408 is displayed in the graphical user interface (e.g., corresponding to block 202 of FIG. 2). For example, conversation transcript 408 (FIG. 4) may include one or more text items (e.g., "I'm bored" and/or "We should do something! Got any ideas?") that may be interpreted via content identification (e.g., block 204 of FIG. 2) and action identification (e.g., block 206 of FIG. 2) to reference a search for an activity. From a review of the conversation transcript 408, however, it may be determined that an entity term for the action query (e.g., an "activity" entity term for a "search for activity" action query) cannot be resolved from the content and/or user input. As such, the activity entity term may be resolved using user attribute data (e.g., block 212 of FIG. 2). For example, the user attribute data may indicate that the user enjoys vintage arcade games, classic movies and bluegrass music (among other interests), and as a result, the activity entity term may have one or more entities mapped thereto, e.g., "arcade games," "classic movies," and "bluegrass music," thereby resolving the entity term. A computer-based action, e.g., a search for activities, may then be performed (e.g., block 210 of FIG. 2), resulting in the generation of interactive content on the computing device.

FIG. 5, for example, illustrates the display of three information "cards" 410, 412, 414 that may be overlaid over at least a portion of the conversation transcript 408 in graphical user interface 400, which may be generated, for example, based on an offline or online search conducted in association with performing the action, and further based on the current location of the computing device. Card 410, for example, presents a result for a fictional arcade, while card 412 presents a result for a classic movie showing at a fictional theater and card 414 presents a result for a bluegrass musical performance by a fictional group at a fictional music venue. In addition, FIG. 5 illustrates that the results of the action may also include, beyond the information cards, additional contextual information and/or controls through which the user may perform additional actions. For example, card 410 includes an offer or coupon as well as context-specific buttons for use in obtaining additional information about the arcade, sharing the card with a friend, and navigating to the arcade. Card 412 also presents a showtime for the movie, as well as context-specific buttons for use in obtaining additional information about the movie, purchasing tickets, adding an event to the user's calendar, sharing the card with a friend, and navigating to the theater. Card 414 also presents a showtime for the performance, as well as context-specific buttons for use in obtaining additional information about the group and the venue, adding an event to the user's calendar, sharing the card with a friend, and navigating to the venue. It will be appreciated that the types of information and context-specific controls that may be presented may vary considerably in different implementations.

Figure 6:
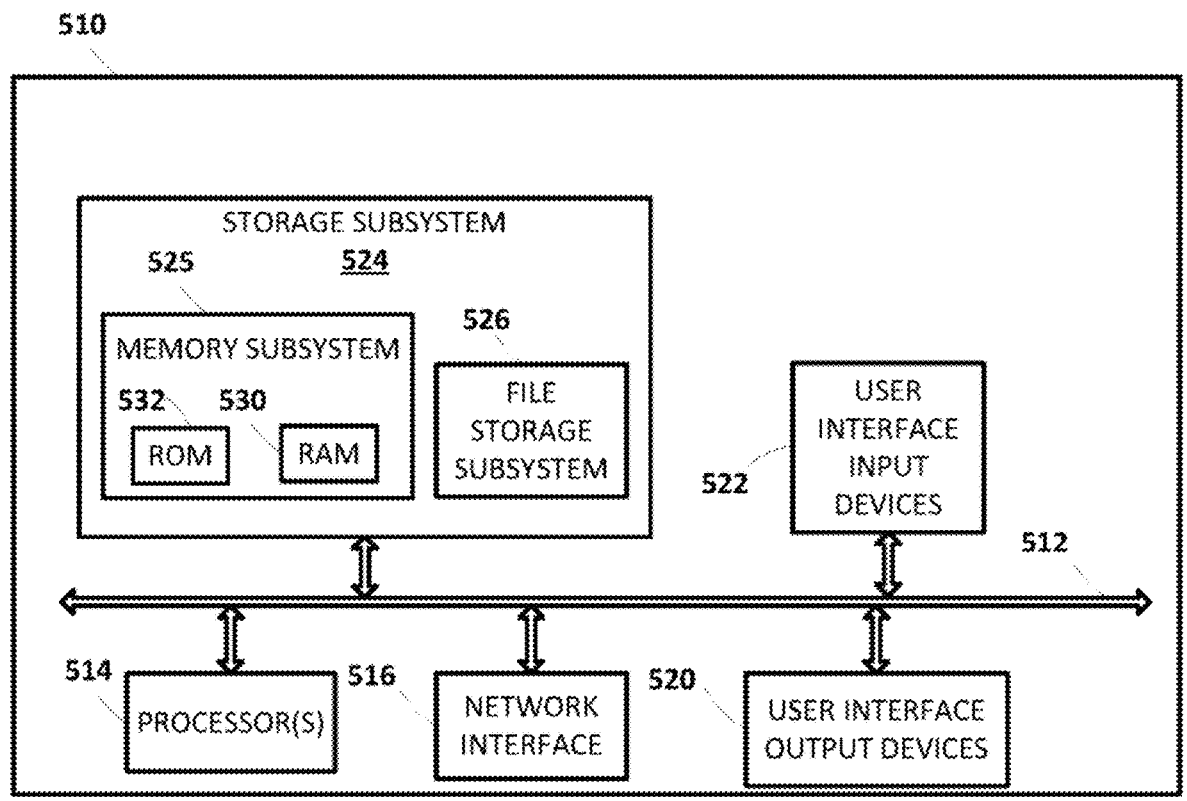
FIG. 6 illustrates an example architecture of a computing device.

FIG. 6 is a block diagram of an example computing device 510 that may optionally be utilized to perform one or more aspects of techniques described herein. In some implementations, computing device 120 and/or any of the other components illustrated in FIG. 1 may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 2 and/or 3.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 6 is intended only as a specific example for purposes of illustrating some implementations. Many other configurations of computing device 510 are possible having more or fewer components than the computing device depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
receiving, at a computing device, input to initiate providing of an action query via the computing device, wherein the input is one of: selection of a virtual button, selection of a hardware button, a voice input, or a gesture input;
identifying, by the computing device, content displayed by the computing device most recently relative to receiving the input;
identifying at least one action term for the action query in response to receiving the input, the action term being mapped to at least one entity term and configured to initiate performance of a computer-based action;
resolving the at least one entity term using the identified content and user attribute data stored in the computing device;
generating interactive content using the identified at least one action term and the resolved at least one entity term of the action query, wherein the interactive content includes a graphical element that, when selected via further input received at the computing device, causes the computing device to perform the computer-based action;
providing, in response to receiving the input, the interactive content for display at the computing device; and
performing the computer-based action in response to a selection of the graphical element when the interactive content is displayed at the computing device.

2. The method of claim 1, wherein performing the computer-based action includes querying a remote computing system and providing a response thereto on the computing device using response data received from the remote computing system.

3. The method of claim 1, wherein performing the computer-based action includes querying a local database stored on the computing device and providing a response thereto on the computing device using response data received from the local database.

4. The method of claim 3, wherein the local database includes point of interest data.

5. The method of claim 1, wherein identifying the at least one action term for the action query in response to receiving the input is based at least in part on the identified content.

6. The method of claim 1, wherein resolving the at least one entity term is based on determining that the action term is a vague action term.

7. The method of claim 1, wherein resolving the at least one entity term is based on determining that an entity in the identified content is subject to multiple interpretations.

8. The method of claim 1, wherein resolving the at least one entity term is based on determining multiple species for a genus determined in the identified content.

9. The method of claim 1, wherein resolving the at least one entity term further uses location data stored in the computing device, the location data including a current location of the computing device, point of interest data stored in a point of interest database in the computing device or beacon data received from a beacon in proximity to the computing device.

10. The method of claim 1, wherein the identified action term is a point of interest search, wherein the at least one entity term includes a point of interest category term, and wherein resolving the at least one entity term using the user attribute data stored in the computing device includes resolving the point of interest category term.

11. The method of claim 10, wherein the point of interest category term is resolvable among one or more of a restaurant category, a shopping category, an activity category, a services category, and an entertainment category.

12. The method of claim 10, wherein resolving the at least one entity term using the user attribute data stored in the computing device includes resolving a subcategory for the resolved point of interest category term.

13. A system, comprising:
a computing device including memory storing instructions and one or more processors operable to execute the instructions in the memory, wherein the instructions comprise instructions to:
receive input to initiate providing of an action query via the computing device, wherein the input is one of: selection of a virtual button, selection of a hardware button, a voice input, or a gesture input;
identify content displayed by the computing device most recently relative to receiving the input;
identify at least one action term for the action query in response to receiving the input, the action term being mapped to at least one entity term and configured to initiate performance of a computer-based action;
resolve the at least one entity term using the identified content and user attribute data stored in the computing device;
generate interactive content using the identified at least one action term and the resolved at least one entity term of the action query, wherein the interactive content includes a graphical element that, when selected via further input received at the computing device, causes the computing device to perform the computer-based action;
provide, in response to receiving the input, the interactive content for display at the computing device; and
perform the computer-based action in response to a selection of the graphical element when the interactive content is displayed at the computing device.

14. The system of claim 13, wherein the instructions to identify the at least one action term for the action query in response to receiving the input identify the at least one action term based at least in part on the identified content.

15. The system of claim 13, wherein the instructions to resolve the at least one entity term include instructions to determine that the action term is a vague action term, instructions to determine that an entity in the identified content is subject to multiple interpretations, and/or instructions to determine an inability to determine a species for a genus determined in the identified content.

16. The system of claim 13, wherein the instructions to resolve the at least one entity term further use location data stored in the computing device, the location data including a current location of the computing device, point of interest data stored in a point of interest database in the computing device or beacon data received from a beacon in proximity to the computing device.

17. The system of claim 13, wherein the identified action term is a point of interest search, wherein the at least one entity term includes a point of interest category term, and wherein the instructions to resolve the at least one entity term using the user attribute data stored in the computing device include instructions to resolve the point of interest category term.

18. At least one non-transitory computer-readable medium comprising instructions that, in response to execution of the instructions by a computing device, cause the computing device to:
receive input to initiate providing of an action query via the computing device;
identify content displayed by the computing device most recently relative to receiving the input;
identify at least one action term for the action query in response to receiving the input, the action term being mapped to at least one entity term and configured to initiate performance of a computer-based action;
resolve the at least one entity term using the identified content and user attribute data stored in the computing device;
generate interactive content using the identified at least one action term and the resolved at least one entity term of the action query, wherein the interactive content includes a graphical element that, when selected via further input received at the computing device, causes the computing device to perform the computer-based action;
provide, in response to receiving the input, the interactive content for display at the computing device; and
perform the computer-based action in response to a selection of the graphical element when the interactive content is displayed at the computing device.

19. The non-transitory computer-readable medium of claim 18, wherein the instructions to identify the at least one action term for the action query in response to receiving the input identify the at least one action term based at least in part on the identified content.

20. The non-transitory computer-readable medium of claim 18, wherein the instructions to resolve the at least one entity term include instructions to determine that the action term is a vague action term, instructions to determine that an entity in the identified content is subject to multiple interpretations, and/or instructions to determine an inability to determine a species for a genus determined in the identified content.

* * * * *